J. THOENNES.
TOWING APPARATUS FOR MOTOR VEHICLES.
APPLICATION FILED NOV. 5, 1921.
1,434,512.
Patented Nov. 7, 1922.
2 SHEETS—SHEET 2.
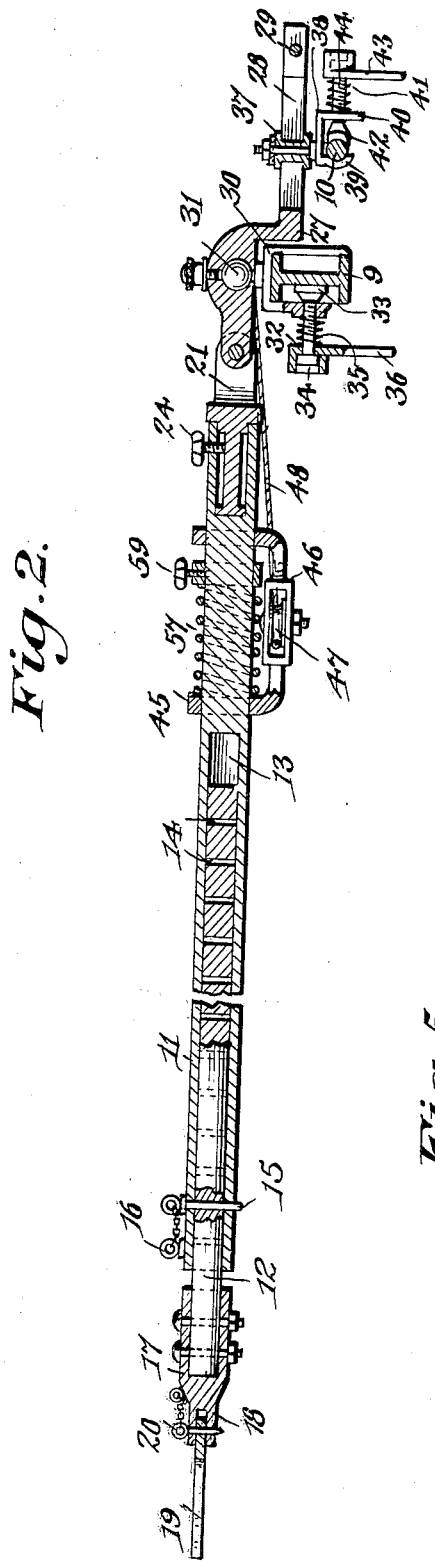
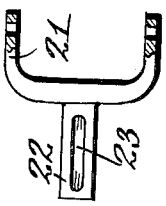
Jacob Thoennes, Inventor
By Richard B. Owen
Attorney Patented Nov. 7, 1922.

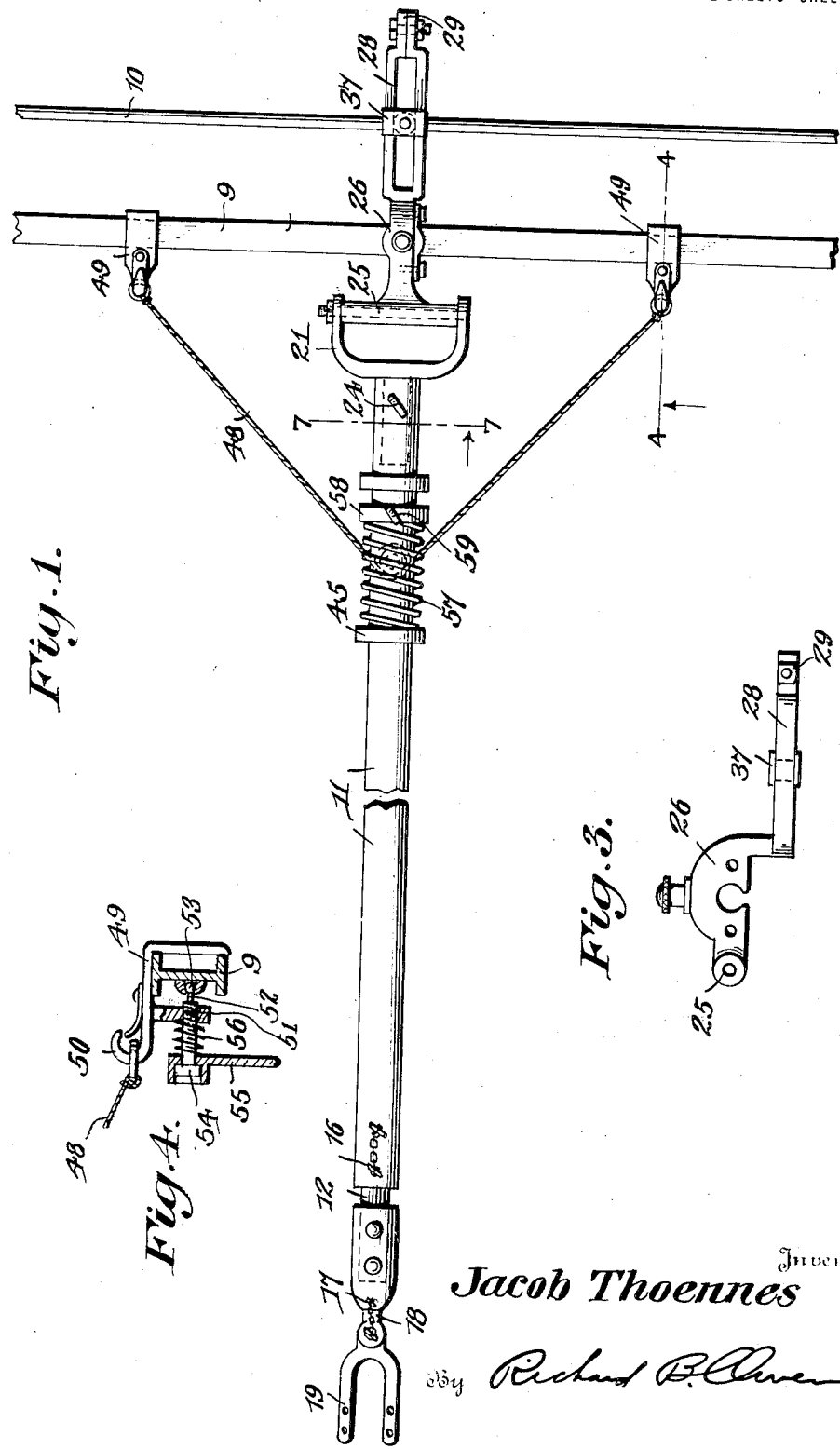

1,434,512

UNITED STATES PATENT OFFICE.

JACOB THOENNES, OF BRANDON, MINNESOTA.

TOWING APPARATUS FOR MOTOR VEHICLES.

Application filed November 5, 1921. Serial No. 513,041.

*To all whom it may concern:*

Be it known that I, JACOB THOENNES, a citizen of the United States, residing at Brandon, in the county of Douglas and State of Minnesota, have invented certain new and useful Improvements in Towing Apparatus for Motor Vehicles, of which the following is a specification.

The present invention relates to towing apparatus for motor vehicles.

Objects of the invention are to provide means for securely connecting a towing vehicle to an incapacitated vehicle to facilitate transportation of the latter; to provide means of this character which is flexible to prevent distortion or damage to either vehicle; to provide means for connecting a towing vehicle to an incapacitated vehicle which will positively steer the latter in the path taken by the towing vehicle; to provide equalizing means which will prevent undue oscillation of the front wheels of the incapacitated vehicle, and to provide a device of this character which is simple in construction and durable and furthermore which may be readily associated with the towing and incapacitated vehicles without the necessity of using any tools whatsoever.

The above and other objects of this invention will be in part described and in part understood from the following description of the present preferred embodiment of the invention taken in connection with the accompanying drawings wherein:—

Fig. 1 is a top plan view of a towing device constructed in accordance with this invention illustrating its application;

Fig. 2 is a longitudinal sectional view of the same;

Fig. 3 is a side elevational view of the axle engaging bracket;

Fig. 4 is a cross sectional view taken on the line 4—4 of Fig. 1 looking in the direction of the arrow;

Fig. 5 is a bottom plan view of the slidable tongue frame;

Fig. 6 is a plan view of the tongue yoke;

Fig. 7 is a cross sectional view taken on the line 7—7 of Fig. 1 looking in the direction of the arrow; and Fig. 8 is a plan view of one of the tongue sections.

In the drawings in order to illustrate the application of this invention a portion of the front axle of an incapacitated vehicle is illustrated at 9 and a portion of the cross connecting rod of the incapacitated vehicle shown at 10. The ends of the cross connecting rod are of course engaged with the steering knuckles of a vehicle in a manner well known in the art.

The device of this invention consists of a tongue made up of two sections 11 and 12. The section 11 is provided with an elongated recess or bore 13 in one of its ends, in which the section 12 is telescopically mounted. The section 12 is provided with a series of openings 14 anyone of which may be engaged by a retaining pin 15. The retaining pin is equipped with an eye in which a chain is mounted, the chain being engaged with an eye 16 which is anchored on the section 11. The upper end of the section 12 detachably carries a thimble 17 the end of which tapers and is bifurcated as indicated at 18. A U-shaped bracket 19 is mounted between the branches of the bifurcation 18 and is pivotally held therebetween through the medium of a pin 20. The pin is anchored on the thimble 17. The bracket 19 is adapted for engagement with a towing vehicle in any desired manner. In fact where a special vehicle is used for towing purposes, such as is customary in service garages, the bracket 19 may be permanently attached to the rear end of the towing vehicle.

Slidably mounted in the rear end of the section 11 of the tongue is a yoke member 21, the shank 22 of which is provided with longitudinal grooves 23. The shank 22 slides in a corresponding recess formed in the section 11 and is held in any desired position therein by means of a set screw 24. The outer ends of the yoke member 21 embrace the terminals of a sleeve 25 which latter is integrally formed on one end of an axle engaging bracket 26. This bracket is adapted to extend rearwardly above the axle 9 of the incapacitated vehicle and extends downwardly at right angles, as indicated at 27 and shown to advantage in Fig. 2, and then projects rearwardly at right angles. This rearwardly, rightangularly extending portion is formed to provide a link 28 the rear extremity of which is separable as indicated at 29. In order to retain the bracket 26 on the axle, a binder 30 is provided which embraces the axle 9 and has a ball 31 extended upwardly therefrom and engageable with a corresponding recess formed in the bracket 26 to provide a ball and socket connection. One side of the binder 30 forms a bearing through which is screw-threaded a follower bolt 32. The inner end of the follower bolt is enlarged to provide a disk 33 on its terminal which bears against the axle 9. The outer end of the bolt is equipped with a head 34 of usual construction. Slidably mounted on the bolt 32 is a wrench 36 which is engageable with the head 34 to feed the bolt through the binder 30. A coil spring 35 is convoluted on the bolt 32 one end thereof bearing against the binder 30 and the opposite end against the wrench 36 to hold the latter on the head 34.

In order to associate the link 28 with the cross connecting rod 10 of the incapacitated vehicle, suitable means is engaged with said link. The means consists of a block 37 which is slidably mounted in the link 28. The block has pending therefrom a frame 38 one end of which is formed to provide a jaw 39 which embraces the rod 10. The opposite end is bent downwardly at right angles, as indicated at 40, to provide a bearing. This bearing has a bolt 41 threaded therethrough, the inner end of which carries a jaw 42. The jaw 42 coacts with the jaw 39 in embracing the rod 10. The outer end of the bolt 41 has formed thereon a head which receives a wrench 43 the latter being held on the head by means of a coil spring 44. In order to prevent undue oscillatory movement of the front wheels of the incapacitated vehicle a suitable equalizing means is provided. This means consists of a frame generally designated 45 the ends of which are bent at right angles and sleeved on the section 11 of the tongue. A portion of said frame midway between the ends is formed to provide a housing 46 in which a pulley wheel 47 is mounted. The pulley has trained thereover a cable 48. The terminals of the cable carry rings which flex over axle clips 49. Each of said clips, as shown to advantage in Fig. 4 consists of a U-shaped body which is engaged over the axle and which has a portion extended laterally therefrom to form a bill 50. One side of said body has a bolt 51 threaded therethrough, the inner end of which is reduced and terminates in a ball 52 which is fitted in a corresponding socket formed in a plate 53. The outer end of the bolt 51 is formed to provide a head 54 upon which a wrench 55 is held by a coil spring 56. The plate 53 is engaged with the axle 9 by threading the bolt 51 through the body of the clip.

In use of this device the bracket 19 is engaged with the towing vehicle and the bracket 26 and link 28 engaged with the axle 9 and cross connecting rod 10 respectively of the incapacitated vehicle. The bracket 26 and rim 28 are associated with the axle and rod through the medium of the mechanism carried thereby as above described. It is understood that the bolts used for securing this mechanism to the axle and rod are operated by the wrenches carried on the bolts so as to eliminate the necessity of using any tools whatsoever. The axle clips 49 are engaged with the axle in an apparent manner and the frame 46 adjusted to the desired point on the section 11 of the tongue. In order to secure the frame in position, but at the same time permit some resiliency so as to avoid breaking the cable 48, a coil spring 57 is provided, this spring being convoluted on the section 11 and having one end thereof bearing against one end of the frame and the opposite end bearing against a collar 58 which is slidably mounted upon the section 11. This collar may be held in any desired position by a set screw 59. As is apparent, the cable 48, connected in the manner above set forth, will tend to equalize the pressure on both sides of the incapacitated vehicle at all times, with obvious beneficial results. By telescoping the sections 11 and 12, it is apparent that the tongue is adaptable for use under different conditions and with different types of vehicles.

Of course, various changes may be made in this device especially in the details of construction, proportion and arrangement of parts. However, the mechanism herein provided will aptly perform the functions herein stated and consequently is illustrative of the principles of the invention.

What is claimed is:—

1. Towing apparatus for motor vehicles including a tongue engageable with both a towing vehicle and an incapacitated vehicle and equipped with a pulley carrying frame, a cable trained over the pulley of said frame, the terminals of which engage the incapacitated vehicle, a spring mounted on said tongue and engageable with said frame to hold the cable taut, and means carried by the tongue to adjust the tension of said spring.

2. Towing apparatus including a tongue one end of which is engageable with a towing vehicle and the opposite end engageable with an incapacitated vehicle, a frame yieldingly mounted on the tongue, and a cable engaged with said frame and having the terminals thereof secured to the front axle of the incapacitated vehicle.

In testimony whereof I affix my signature in the presence of two witnesses.

JACOB THOENNES.

Witnesses:
FRANK BUSCHER,
ALFRED J. BUSCHER.